United States Patent
Roytman et al.

(10) Patent No.: US 11,016,694 B1
(45) Date of Patent: May 25, 2021

(54) STORAGE DRIVERS FOR REMOTE REPLICATION MANAGEMENT

(71) Applicant: EMC IP Holding Company LLC, Hopkinton, MA (US)

(72) Inventors: Evgeny Roytman, Sharon, MA (US); Shreesha PaiManoor, Chelmsford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/797,210

(22) Filed: Oct. 30, 2017

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01)

(58) Field of Classification Search
CPC ......... G06F 3/065; G06F 3/0619; G06F 3/067
See application file for complete search history.

(56) References Cited

U.S. PATENT DOCUMENTS

| | | | | |
|---|---|---|---|---|
| 5,742,792 A * | 4/1998 | Yanai | ...................... | G06F 3/0601 710/1 |
| 6,324,654 B1 * | 11/2001 | Wahl | .................... | G06F 11/2066 707/999.202 |
| 7,185,192 B1 * | 2/2007 | Kahn | .................... | G06F 21/6218 707/999.003 |
| 7,191,198 B2 * | 3/2007 | Asano | .................. | G06F 11/2007 |
| 7,552,125 B1 * | 6/2009 | Evans | ....................... | G06F 16/00 |
| 7,647,526 B1 * | 1/2010 | Taylor | .................. | G06F 11/1092 714/6.32 |
| 7,984,259 B1 * | 7/2011 | English | .................... | G06F 3/064 711/165 |
| 8,055,842 B1 * | 11/2011 | Iyer | ....................... | G06F 3/0607 360/48 |
| 9,063,799 B1 * | 6/2015 | Chen | ......................... | G06F 8/76 |
| 2002/0035667 A1 * | 3/2002 | Bruning, III | ........... | G06F 3/0619 711/114 |
| 2005/0015407 A1 * | 1/2005 | Nguyen | ............... | G06F 11/2069 |
| 2005/0044162 A1 * | 2/2005 | Liang | ................ | G06F 17/30067 709/212 |
| 2005/0102553 A1 * | 5/2005 | Cochran | ............ | G06F 11/2064 714/6.12 |
| 2005/0240986 A1 * | 10/2005 | Yamamoto | ........... | H04L 41/0803 726/1 |
| 2006/0031631 A1 * | 2/2006 | Abe | ....................... | G06F 3/0608 711/112 |
| 2006/0089934 A1 * | 4/2006 | Jibbe | ..................... | G06F 11/2247 |
| 2007/0079060 A1 * | 4/2007 | Burkey | ................ | G06F 3/0605 711/112 |

(Continued)

OTHER PUBLICATIONS

Rouse, What is an application program interface, Apr. 2017. (Year: 2017).*

*Primary Examiner* — Ramon A. Mercado
(74) *Attorney, Agent, or Firm* — Krishnendu Gupta; Lesley Leonessa

(57) ABSTRACT

A method is used in providing remote replication management. A storage management system detects a storage driver for a storage array, where the storage driver enables managing remote replication for the storage array. The storage management system manages remote replication of storage objects for the storage array by using the storage driver, where the storage driver includes interfaces for managing remote replication.

20 Claims, 5 Drawing Sheets

(56) References Cited

U.S. PATENT DOCUMENTS

| | | | |
|---|---|---|---|
| 2007/0185973 A1* | 8/2007 | Wayda | G06F 3/0607 709/217 |
| 2009/0300079 A1* | 12/2009 | Shitomi | G06F 3/0605 |
| 2010/0057987 A1* | 3/2010 | Liu | G06F 3/0659 711/114 |
| 2016/0210044 A1* | 7/2016 | Mitkar | G06F 3/061 |

* cited by examiner

STORAGE DRIVERS FOR REMOTE REPLICATION MANAGEMENT

BACKGROUND

Technical Field

This application relates to providing storage drivers for remote replication management for storage arrays.

Description of Related Art

Computer systems may include different resources used by one or more host processors. Resources and host processors in a computer system may be interconnected by one or more communication connections. These resources may include, for example, data storage devices such as those included in the data storage systems manufactured by Dell or Dell EMC Corporation. These data storage systems may be coupled to one or more servers or host processors and provide storage services to each host processor. Multiple data storage systems from one or more different vendors may be connected and may provide common data storage for one or more host processors in a computer system.

A traditional storage array (herein also referred to as a "data storage system", "disk storage array", "disk array", or simply "array") is a collection of hard disk drives operating together logically as a unified storage device. Storage arrays are designed to store large quantities of data. Storage arrays typically include one or more storage array processors (SPs), for handling requests for allocation and input/output (I/O) requests. An SP is the controller for and primary interface to the storage array.

A storage array may be thought of as a system for managing a large amount of a resource, i.e., a large number of disk drives. Management of the resource may include allocation of a portion of the resource in response to allocation requests. In the storage array example, portions of the storage array may be allocated to, i.e., exclusively used by, entities that request such allocation.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, such as disk drives, disk storage arrays, network storage devices, storage area networks, and the like, are called upon to store and manage a significant amount of data (e.g., gigabytes, terabytes, petabytes, etc.) that is written and read by many users. For example, a traditional storage array may include a collection of hard disk drives operating together logically as a unified storage device. Storage arrays are typically used to provide storage space for a plurality of computer file systems, databases, applications, and the like. For this and other reasons, it is common for physical storage arrays to be logically partitioned into chunks of storage space, called logical units, or LUs. This allows a unified storage array to appear as a collection of separate file systems, network drives, and/or volumes.

Managing significant amounts of data requires data protection systems, such as data replication. Data replication protects data by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY OF THE INVENTION

A method is used in providing remote replication management, a storage driver for a storage array is detected by a storage management system. The storage driver enables managing remote replication for the storage array. Remote replication of storage objects for the storage array is managed by using the storage driver, where the storage driver includes interfaces for managing remote replication.

BRIEF DESCRIPTION OF THE DRAWINGS

Features and advantages of the present invention will become more apparent from the following detailed description of exemplary embodiments thereof taken in conjunction with the accompanying drawings.

DETAILED DESCRIPTION OF EMBODIMENT(S)

Figure 1:
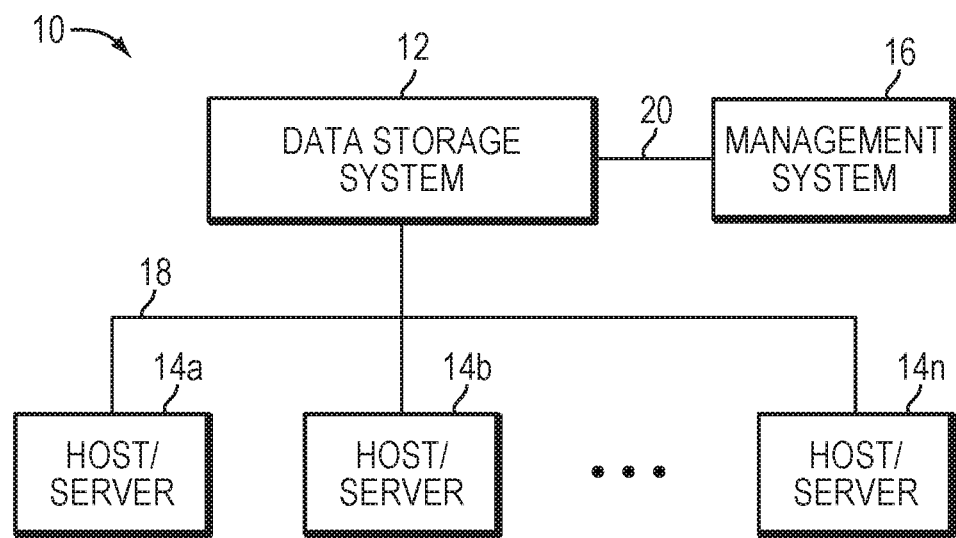
FIG. 1 is simplified illustration of a computer system, in accordance with an embodiment of the present disclosure.

Described below is a technique for use in managing software upgrades in storage systems, which technique may be used to provide, among other things, detecting, by a storage management system, a storage driver for a storage array, where the storage driver enables managing remote replication for the storage array, and managing remote replication of storage objects for the storage array by using the storage driver, where the storage driver includes interfaces for managing remote replication.

Generally, storage arrays from different vendors are managed by a storage management system such as ViPR Controller from Dell EMC. A storage management system manages different storage arrays by providing a Software Development tool Kit (SDK) for developing storage drivers for managing storage arrays. A SDK is typically a set of software development tools that allows creation of applications and drivers. In one example embodiment, ViPR Controller provides Southbound SDK for developing storage drivers. A storage driver specific to a storage array is developed by using Application Programming Interfaces (API) methods defined in SDK specification associated with the SDK. A storage management system uses a storage driver created specifically for a storage array to manage services on that storage array such as storage provisioning for the storage array. There exists many storage drivers (also referred to as "SDK drivers") that are implemented for a storage management system to provide support for managing storage arrays provided by different storage vendors. However, conventionally, SDK such as Southbound SDK associated with a storage management system such as ViPR Controller does not provide any APIs for provisioning and managing remotely replicated volumes.

Data replication protects data by creating a copy of the organization's production site data on a secondary backup storage system, and updating the backup with changes. The backup storage system may be situated in the same physical location as the production storage system, or in a physically remote location. Remote replication is the process of copying production data to a device at a remote location for data protection or disaster recovery purposes.

Conventional storage management systems do not provide any storage management API and/or integration framework for managing remote replication. One such example of conventional storage management system is Open Stack Cinder Storage Management API which provides specifications for storage driver API for Open Stack Cinder Controller. However, such conventional system does not provide any API to manage remotely replicated storage. Instead, such conventional system provides API for only managing storage that is local to such conventional system. Further, a conventional storage system only provides native implementation for storage management for a specific storage array type only. Thus, in such a conventional system, a storage system of a specific type by a specific storage vendor includes the ability to manage remotely replicated storage that is specific to such specific type of the storage system by such specific storage vendor. Thus, conventionally, each storage system vendor provides support for management of storage that is associated with storage systems provided by that storage vendor and no open specifications for remote replication management exist that can support management of different storage systems by different storage vendors.

Thus, conventional technologies for remote replication management support require proprietary software to be developed for specific storage array types. Conventional technologies that provide remote replication management require implementation of a complete internal software management stack in the storage management product, and knowledge of how to implement remote replication for specific storage array types within the storage management system. Typically, this effort is not feasible for different types of storage arrays as each storage vendor possesses only the know-how to implement support for managing remotely replicated volumes for its own storage system type thereby making the support for managing remotely replicated volume only available for a specific storage array. Some conventional technologies provide an Application Programming Interface (API) for local replication only, but not for remote replication. Conventionally, it may not be possible to provide remote replication in a storage management product for storage arrays from a variety of vendors.

By contrast, in at least some implementations in accordance with the current technique as described herein, by providing a generic API and integration framework, that is device independent, a storage management system is enabled to provide remote replication management of different types of storage arrays from different storage vendors. Embodiments of the current technique disclosed herein provide a Software Development Kit (SDK) associated with a storage management system to allow storage array vendors, their partners and third party integrators to develop storage drivers that interface with the storage management system to provide remote replication for storage arrays. In at least one embodiment of the current technique, the storage management system accesses the information in the storage drivers to provide remote replication management for the storage arrays associated with the drivers. In other words, in at least one embodiment of the current technique, the storage management system provides remote replication support for any storage array that has an associated storage driver that interfaces with, and provides remote replication information to, the storage management system.

Embodiments of the current technique disclosed herein provide a storage management system that detects a storage driver that enables managing remote replication for a storage array. The storage management system manages remote replication of storage objects for the storage array by using the storage driver that includes interfaces for managing remote replication.

Embodiments of the current technique disclosed herein provide provisioning of remotely replicated volumes, management of remote replication links, discovery of remotely replicated volumes, replication configuration on storage arrays, and placement of remotely replicated volumes.

Embodiments of the current technique disclosed herein provide a software stack within the storage management system to support management of remotely replicated volumes for different storage systems.

In at least one embodiment of the current technique, an SDK such as Southbound ViPR Controller SDK for storage drivers is extended to add a generic API for remote replication management. Further, in at least one embodiment of the current technique, a software stack is included in a storage management system such as ViPR Controller to support management of remotely replicated volumes for storage drivers that implement remote replication APIs as part of implementation of specification provided by SDK such as Southbound SDK. Thus, in at least one embodiment of the current technique, storage array vendors, their partners and third party integrators are enabled to develop storage drivers for ViPR Controller with support for remotely replicated volumes. In at least one embodiment of the current technique, Southbound SDK for remote replication includes a new remote replication API and information such as supporting object model classes in Southbound SDK specification, a ViPR controller module to execute remote replication management requests as part of common ViPR controller provisioning workflows, ViPR Controller data model and REST API for remote replication management.

Thus, in at least one embodiment of the current technique, an open remote replication API specification is provided as part of SDK such as Southbound Driver SDK and a generic remote replication management framework is created in a storage management system such as ViPR Controller to support remote replication management for different storage array types by the storage management system. Further, in at least one embodiment of the current technique, the generic remote replication management framework is device independent and provides an ability to manage remotely replicated volumes for any storage array that provides a storage driver including implementation of remote replication APIs based on specification provided by the SDK. In at least one embodiment of the current technique, specific information indicating how each storage array implements remote replication is encapsulated in a storage drive associated with such storage array.

Further, in at least one embodiment of the current technique, APIs specified in SDK specification includes APIs to discover remote replication configuration for storage arrays and APIs to create and manage remotely replicated volumes. Further, storage management system modules for remote replication provide APIs for provisioning of remotely replicated volumes and management of remote replication links, discovery of remote replication configuration on storage arrays, placement of remotely replicated volumes, data model to store remote replication configuration, and execution of remote replication requests to storage drivers.

In certain embodiments, the following definitions may include but are not limited to:

A data service may be a service for receiving, processing, storing, and protecting data. In certain embodiments, data services provide the high-level data and storage management capabilities of the system.

A control path may be a way to establish and control access to the data.

A data path may be the path the data takes.

A storage medium may be any medium that is capable of storing data, including, but not limited to a storage array, a storage cluster, a physical disk, a virtual disk, and a virtual storage system.

A tenant may represent an organization operating within a data storage system. In some embodiments, a tenant may be created in the system for the purposes of security isolation.

A project may be a resource organization abstraction that maps resources to applications, virtual data centers, departments, or other entities meaningful to the user. In some embodiments, a user may create their own projects, and may associate multiple resources from different services with them. In most embodiments, resources from one project maybe shared between users under the same tenant.

Generally, a data storage array or system may be one or more physical boxes, a cluster of physical boxes, or a virtual machine. In conventional systems, the data storage array or system may have one control path and some number of data paths. In typical systems, one or more data path ports may provide data path access to the storage resources contained within the storage system. Typically, the protocols for the data path ports may be fiber channel, Internet Protocol (IP), iSCSI, NFS, or CIFS. Usually, to add more capacity to a data storage array or system, more physical disks, more inline cards, or more CPUs may be added to the data storage array or system. Conventionally, the data storage system or array may be a cluster of storage mediums. Typically, providing management for large numbers of data storage arrays or systems may be challenging.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary r commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by Dell EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems nay also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

Figure 2:
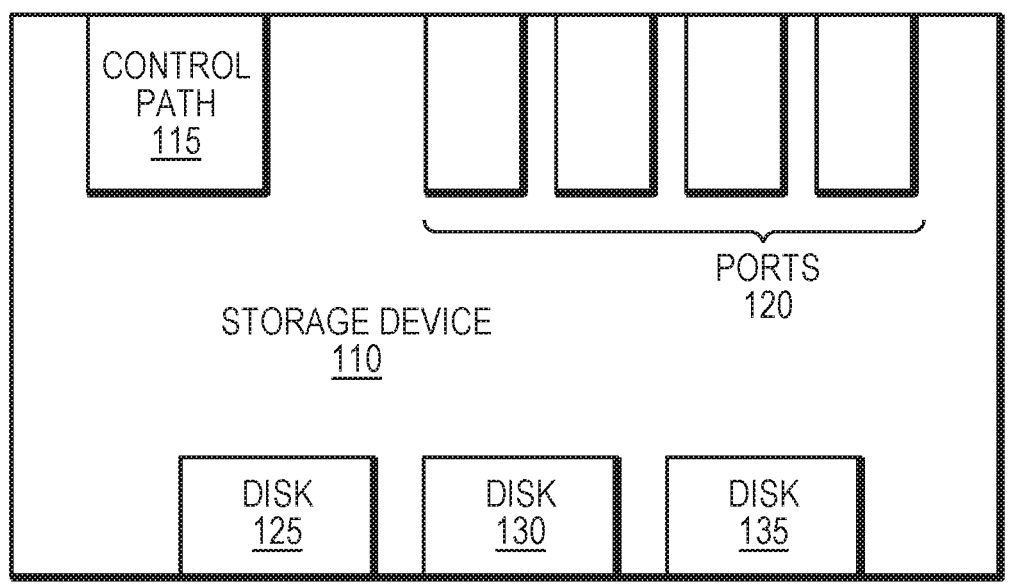
FIG. 2 is a simplified illustration of a data storage device, in accordance with an embodiment of the present disclosure.

Refer, now to the example embodiment of FIG. 2 which illustrates a sample storage device. Storage device 110 has control path 115, ports 120, and disks 125, 130, and 135. Control path 115 enables a user to interface with storage device 110. Control path 115 enables a user to access disks 125, 130, and 135, via the services storage device 110 offers, through one or more of ports 120.

Embodiments disclosed herein may enable provisioning of data services across heterogeneous storage systems with a single control path. In an example embodiment, a data storage system may be enabled that provides a single control path and multiple data paths for heterogeneous data storage arrays or data storage systems. In some embodiments, the data storage system may enable multiple types of storage systems such as VMAX, VNE, Isilon, Greenplum, from Dell EMC and those from NetApp to be integrated together. In an embodiment, the data storage system may be infinitely scalable to include any number of storage systems. In most embodiments, interaction with the data services may be through an API. In certain embodiments, the data storage system may offer different types of data services. In further embodiments, a data storage system may be enabled to allow new data services to be added.

In certain embodiments, the data storage system may enable the array to provide multiple types of data services through a single control path. In some embodiments, the data storage system and the data services offered by the data storage system may be extensible. In most embodiments, the data storage system may offer file, block and object data services. In certain embodiments, the data storage system may enable new data services to be created. In most embodiments, object data services may be implemented through the use of a key and an object pairing. In alternative embodiments, the data storage system may enable the user to define further types of data services. In a further embodiment, the data storage system may implement a database data service. In another further embodiment, the data storage system may enable a message queuing data service.

In at least one embodiment, a user may interact with the data storage system through an API. In some embodiments, the data storage system may enable a set of data services, with different quality of services. In at least some embodiments, the data services may be provided through an API. In most embodiments, the API may abstract the set of storage systems available to the data storage system away from the user. In at least some embodiments, the data storage system may enable data services, such as storage provisioning through the data storage system.

In most embodiments, the data storage system may have a BIOS or set of drivers to enable it to interact with multiple types of storage systems. In certain embodiments, the BIOS may interact with a set of heterogeneous arrays. In further embodiments, the BIOS may have a set of drivers enabling it provide data services on different types of heterogeneous arrays. In most embodiments, the BIOS may know how to control and understand what the underlying devices are capable of doing. In further embodiments, the BIOS may be able to determine the performance information of the underlying devices such as how much storage and what ports the device has. In other embodiments, the BIOS may be able to determine or query the performance information of the underlying devices. In some embodiments, the BIOS may be software or use software to communicate with the underlying devices. In other embodiments, the BIOS may communicate with the devices using one or more protocols such as TCP/IP. In still further embodiments, the BIOS may be run through a set of Virtual Machines.

In most embodiments, requests to the data storage system may be handled through an API. In some embodiments, an API may publish a set of possible interfaces with the data storage system. In certain embodiments, the interfaces may enable the remote replication and/or provisioning of data services to the underlying storage systems available to the data storage system. In further embodiments, the data storage system may have an API server. In most embodiments, the API server may receive API requests sent to the big array and determine whether to process the requests. In an embodiment, the API server may have an authorization module to authenticate a particular user or tenant. In other embodiments, the API server may determine another module to handle the API request.

In some embodiments, there may be a data service module which may offer block, file, and object storage. In certain embodiments, the data services module may publish the data service available. In certain embodiments, each of the modules may be able to publish the information about the services the module offers. In most embodiments, the published information may be available in the API via the API server. In certain embodiments, there may a provisioning engine. In most embodiments, a provisioning engine may implement storage requests.

Figure 3:
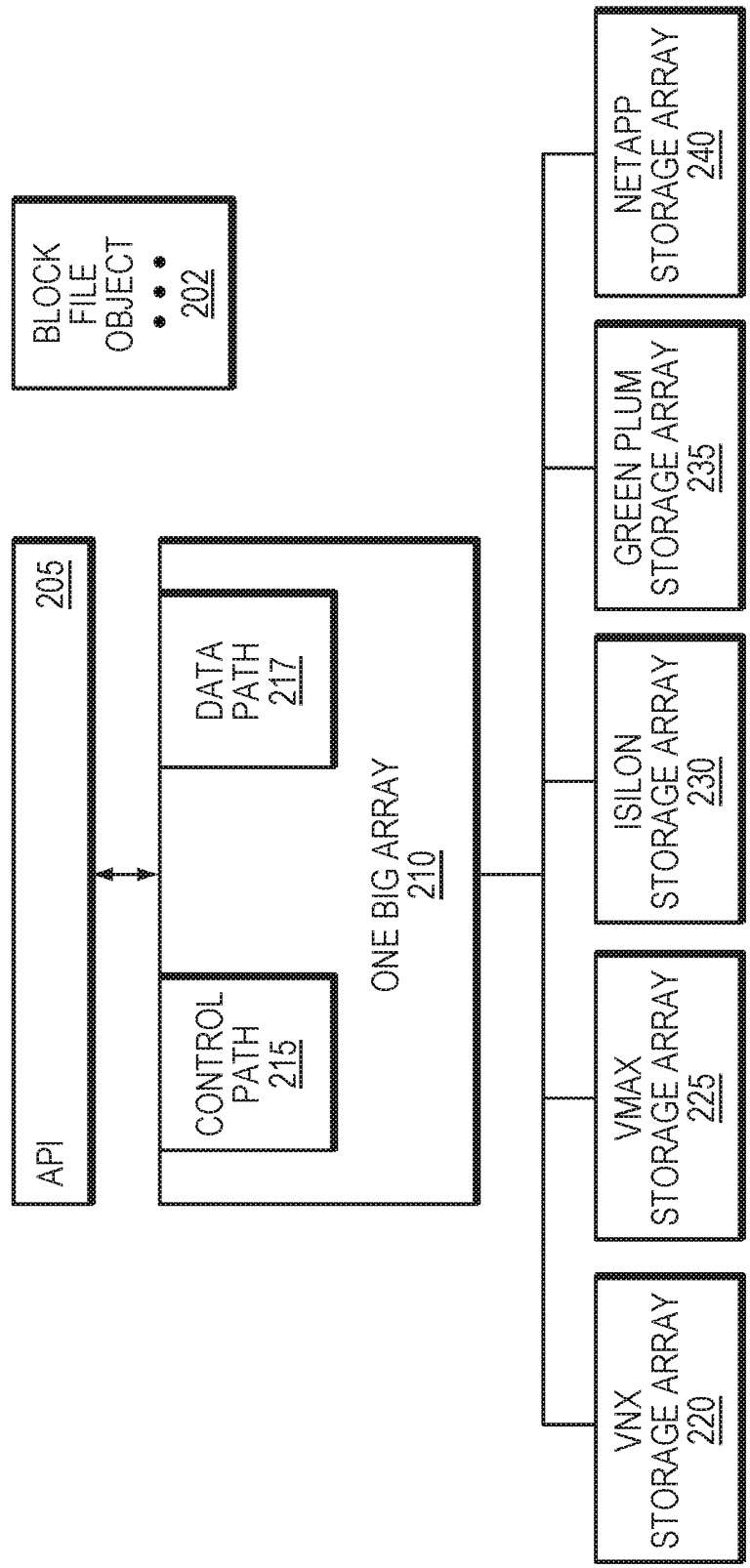
FIG. 3 is a simplified illustration of a data storage system with a single control path, in accordance with an embodiment of the present disclosure.

Refer now to the example embodiment of FIG. 3. The example embodiment of FIG. 3 illustrates a sample embodiment of a data storage system. API 205 is exposed to a user or machine. API 205 may be used to communicate requests to Data storage system 210. Data storage system 205 has control path 215 and data path 217. Data storage system 210 provides services such as block, file, and object data services 202. Data storage system 210 consumes and offers storage provided by storage arrays from different vendors such as VNX 220, VMAX 225, Isilon 230, GreenPlum 235, and NetApp 240. Data storage system 210 enables, through API 205, this storage to be provisioned to users.

Figure 4:
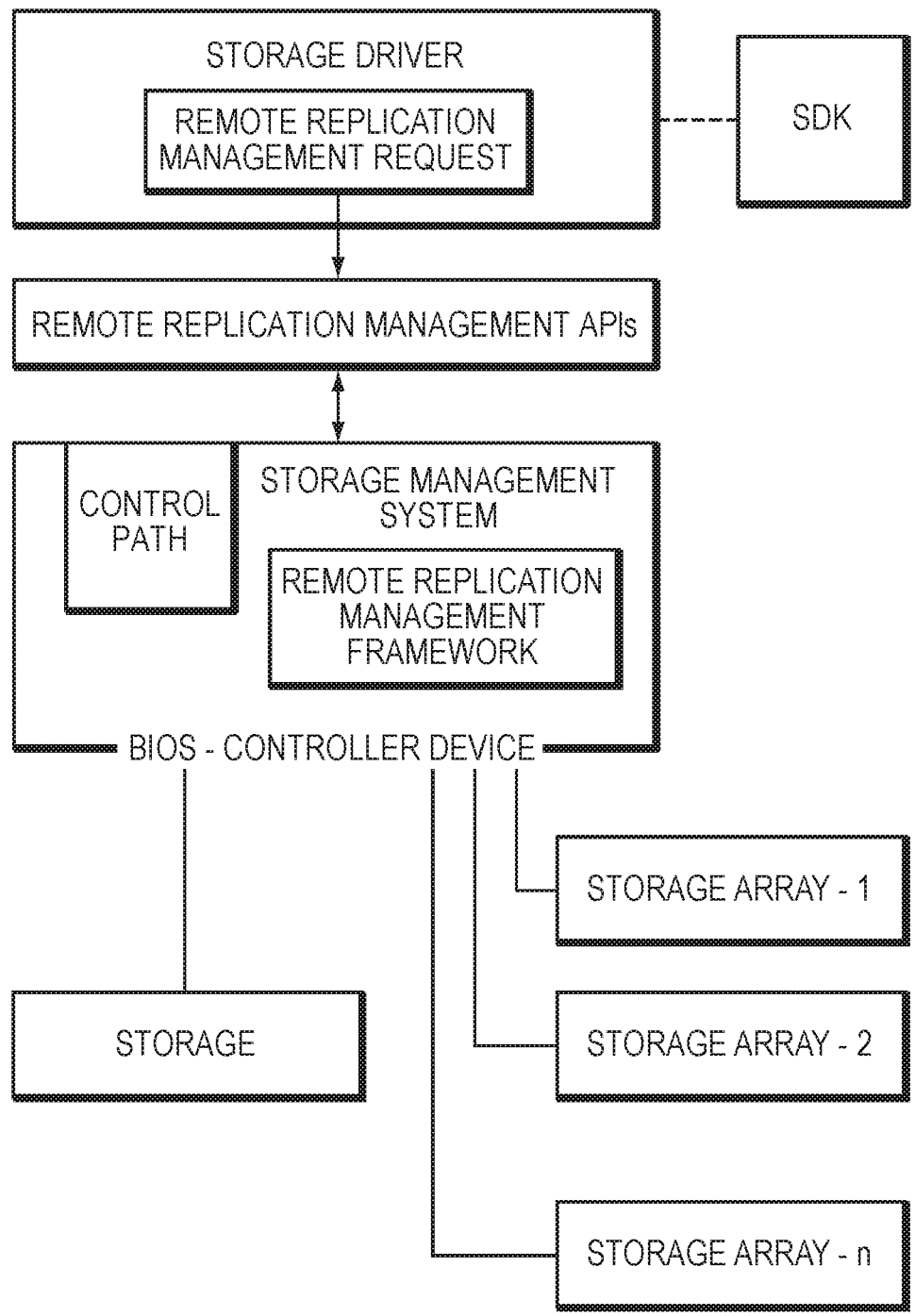
FIG. 4 is an simplified illustration of a storage management system with a remote replication management framework, in accordance with an embodiment of the present disclosure.

Refer now to the example embodiment of FIG. 4. FIG. 4 illustrates an example illustration of a storage management system with a remote replication management framework. The generic remote replication management framework provides an ability to manage remotely replicated volumes for any storage array that provides a storage driver including implementation of remote replication APIs based on specification provided by the SDK. The SDK is used to develop storage drivers that are used to manage remote replication for storage arrays. The storage drivers provide information to the remote replication management framework to handle remote replication management requests that are invoked on behalf of the storage arrays associated with their respective storage drivers.

Figure 5:
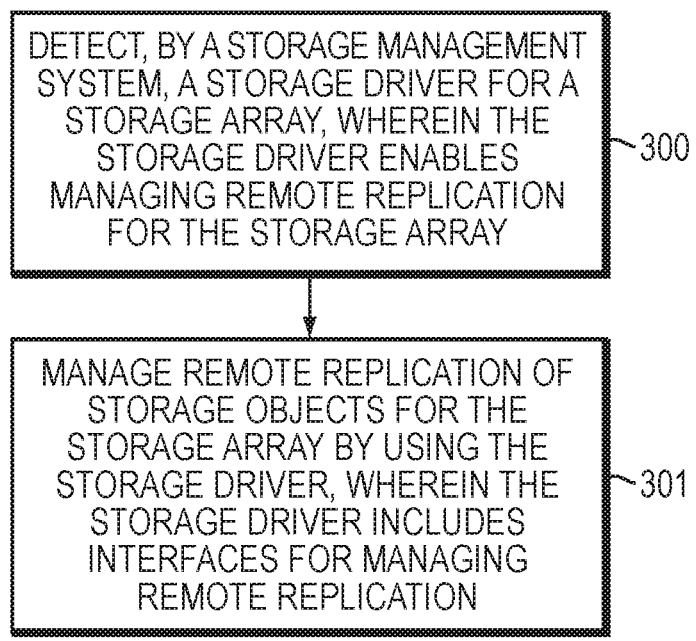
FIG. 5 is a flowchart illustrating an embodiment of a method for providing remote replication management, according to embodiments disclosed herein.

FIG. 5 is a flowchart of an example embodiment of the current technique disclosed herein for providing remote replication management. In at least one embodiment of the current technique, the storage management system, operating on a storage system, detects a new storage driver for a storage array (step 300). For example, a discovery API executing on the storage system detects a new storage driver for a storage array. The storage system may be managed by, for example, Dell EMC's Southbound SDK drivers. In an example embodiment of the current technique, the storage driver is created using a SDK associated with the storage management system. In an example embodiment of the current technique, the device specific replication features are handled by the storage driver since different storage array types have different configurations of their remote replication configuration. For example, if there is a link between two storage volumes, the storage driver may contain information detailing how to handle the link between the two storage volumes.

In an example embodiment of the current technique, the storage management system detects a storage array associated with the storage driver. For example, storage administrator may initiate discovery of physical assets on a storage array using an interactive user panel associated with the storage management system. During the discovery operation, the storage management system detects at least one storage array. For example, for each storage array that is managed by a storage driver, the storage management system discovers remote replication sets with their respective properties, and for each storage array that is managed by a storage driver, the storage management system discovers the remote replication groups where the respective storage array is either a target or a source.

In an example embodiment, when the storage management system detects a storage driver for a storage array, the storage management system queries the storage driver for remote replication information. In an example embodiment, the storage management system discovers data, such as the properties of the remote replication sets and remote replication groups. The storage management system uses this data to learn the remote replication capabilities of each storage array that was discovered. In an example embodiment, the storage management system also comprises a storage drive SDK that defines model types for remote replication sets, remote replication groups, remote replication pairs, and remote replication modes. The storage drive SDK may also define discovery API methods for remote replication configuration, for example, 1-to-1, 1-to-n, n-to-1, etc.

Using the remote replication information, the storage management system builds a data model for a storage array managed by the storage management system. In an example embodiment, the storage management system provides a generic standard model. As the storage management system discovers storage arrays, and queries the associated storage driver for details associated with those storage arrays (i.e., remote replication information, how those storage arrays support remote replication, etc.), the storage management system builds the data model from the generic standard model. In an example embodiment, when the storage management system builds a data model for the storage array using the remote replication information, the storage management system builds a data model for at least one of a remote replication set, remote replication group, and remote replication pair. In an example embodiment, the data model defines persistent types to store information about the discovered remote replication sets and remote replication groups, as well as provisioned remote replication groups and remote replication pairs.

In an example embodiment of the current technique, when the storage management system queries the storage driver for remote replication information, the storage management system queries the storage driver for at least one of storage array features, and remote replication support information. In this example embodiment, the storage management system may transmit to a storage driver associated with the storage array, a request to identify at least one of remote replication sets and remote replication groups associated with the storage array, where the storage driver may provide device specific replication features. In an example embodiment of the current technique, for each remote replication set identified, the storage management system requests at least one of:

i) A remote replication set identity associated with the remote replication set.

ii) A current replication state associated with the remote replication set.

iii) At least one supported replication granularity associated with the remote replication set.

iv) At least one supported replication mode.

v) At least one type of replication element that can be provisioned in the remote replication set.

vi) A role associated with each storage system associated with the remote replication set.

vii) A storage system identity associated with the each storage system associated with the remote replication set.

viii) identification of whether the at least one supported replication mode automatically enforces group consistency of link operations.

ix) Identification of whether the at least one supported replication mode cannot enforce group consistency of link operations.

In another example embodiment of the current technique, for each remote replication group identified, the storage management system requests at least one of:

i) A remote replication group identity associated with the remote replication group.

ii) A role associated with each storage system associated with the remote replication group, wherein the role identifies at least one of a target system and a source system.

iii) A target system identity associated with the at least one target system.

iv) A source system identity associated with the at least one source system.

v) At least one supported replication mode.

vi) Identification of whether the at least one supported replication mode enforces group consistency of link operations.

vii) A current replication state associated with the remote replication group.

viii) At least one supported replication granularity associated with the remote replication group.

ix) At least one storage port associated with the remote replication group.

In at least one embodiment of the current technique, the storage management system manages remote replication of storage object for a storage array by using a storage driver associated with the storage array, where the storage driver comprises interfaces for managing remote replication (step 301). In an example embodiment of the current technique, the storage management system manages remote replication of storage objects for the storage array by using the storage driver, where the storage driver includes interfaces for managing remote replication. In an example embodiment, during runtime remote replication management, the storage management system uses the data model (that was created by querying the storage driver associated with the storage array) in a manner that is specific to that type of storage array (for example, for "storage array type A"). For example, the storage management system may query the storage driver to determine if the array supports remote replication groups. If the storage driver responds in the affirmative, then the storage management system may query the storage driver to determine if the storage array enforces group consistency for remote replication operations. If the storage driver responds in the affirmative, then the storage management system determines that the failover command cannot be performed for individual group members on this type of storage array (i.e., "storage array type A") during runtime remote replication management. In another example embodiment, a user, such as a system administrator performs remote replication management using a graphical user interface. In this example embodiment, if the user selects "storage array type A", then the storage management system, when presenting runtime storage management options on the graphical user interface, will not provide "failover" as a possible remote replication management option for "storage array type A". In an example embodiment, the storage management system provides replication link management operations for all supported replication link granularities, for example, establish/split, suspend/resume, failover/failback, sync, swap, etc.

In an example embodiment, when the storage management system manages remote replication of storage objects for the storage array using the storage driver, the storage management system provides a graphical user interface for a user to manage remote replication, where at least one element in the graphical user interface is determined by data obtained from the data model. For example, the storage management system provides an interactive graphical user interface for a user to initiate commands associated with runtime remote replication management, via the graphical user interface. The storage management system presents, on the graphical user interface, fields specific to the storage array. In an example embodiment, the storage management system determines the fields appropriate for, and relevant to the storage array, based on the data obtained from the data model. In an example embodiment, the storage management system receives a request from the user, via the graphical user interface, to manage remote replication for at least one user selected device. In response, the storage management system verifies, using the data model, valid remote replication operations associated with at least one user selected device. In response to the verification, the storage management system presents to the user, on a display associated with the graphical user interface, the valid remote replication operations associated with the user selected device. The valid remote replication operations may comprise verification of provisioning of new remote replication groups, provisioning of new remotely replicated volumes, and remote replication link management operations. For example, as noted above, a storage array that is identified as supporting remote replication groups and also enforces consistency, does not allow failover for individual group elements. Thus, when the storage management system provides the graphical user interface, the storage management system will not enable the "failover" option (or display the "failover" option to the user) for individual group dements when presenting runtime remote replication management options associated with the selected storage array.

In an example embodiment, the storage management system provisions at least one remote replication pair by transmitting to a storage driver associated with the storage array, a request to create a source volume, a request to create a target volume, and a request to establish a link between the source volume and the target volume. The request to establish the link comprises requesting remote replication mode for the link (for example, the device specific mode of replication link between volumes: synchronous/asynchronous/asynchronous with write order consistency/periodic replication, etc.). In response, the storage management system receives from the storage driver associated with the storage array, link properties, replication mode, and replication state for the remote replication pair. The storage management system then stores the link properties, replication mode, and replication state associated with the remote replication pair in the data model.

The following description is presented to enable one of ordinary skill in the art to make and use embodiments disclosed herein, and are provided in the context of a patent application and its requirements. Various modifications to the embodiment will be readily apparent to those skilled in the art and the generic principles herein may be applied to other embodiments. Thus, embodiments disclosed herein are not intended to be limited to the embodiment shown but is to be accorded the widest scope consistent with the principles and features described herein.

Embodiments disclosed herein can take the form of an entirely hardware embodiment, an entirely software embodiment or an embodiment containing both hardware and software elements. Furthermore, embodiments disclosed herein can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified local function(s). It should also be noted that, in some alternative implementations, the functions rioted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of embodiments disclosed herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A method and system for providing remote replication management have been disclosed. Although embodiments disclosed herein have been described in accordance with the embodiments shown, one of ordinary skill in the art will readily recognize that there could be variations to the embodiments and those variations would be within the spirit and scope of embodiments disclosed herein. Accordingly, many modifications may be made by one of ordinary skill in the art without departing from the spirit and scope of the appended claims.

What is claimed is:

1. A method for use in providing remote replication management, the method comprising:
    providing a remote replication management framework, for non-native storage arrays, that is device independent, comprising a development toolkit;
    detecting, by a storage management system, a storage driver for a storage array, wherein the storage driver, created using the development toolkit, enables managing remote replication for the storage array, wherein the storage management system queries the storage driver to determine supported remote replication capabilities, and wherein the storage management system requests, from the storage driver, identification of remote replication set identities associated with remote replication sets associated with the storage array; and
    managing remote replication of storage objects for the storage array by the remote replication management framework using the storage driver, wherein the storage driver includes interfaces for managing remote replication.

2. The method of claim 1, wherein the storage driver is created using a specification and the development toolkit, wherein the specification and development toolkit provides information regarding a set of interfaces required to be developed and included in the storage driver.

3. The method of claim 1, wherein the storage objects include remotely replicated volumes.

4. The method of claim 1, wherein the storage driver interacts with a remote replication management framework included in the storage management system for managing remote replication of the storage objects.

5. The method of claim 1, wherein detecting, by the storage management system, the storage driver for the storage array comprises:
    querying the storage driver for remote replication information; and
    building a data model for the storage array using the remote replication information.

6. The method of claim 5, wherein querying the storage driver for remote replication information comprises:
    querying the storage driver for at least one of storage array features or remote replication support information.

7. The method of claim 6, wherein querying the storage driver for at least one of storage array features or remote replication support information comprises:
    transmitting to the storage driver a request to identify at least one of remote replication sets and remote replication groups associated with the storage array, wherein the storage driver provides device specific replication features.

8. The method of claim 5, wherein building the data model for the storage array using the remote replication information comprises:
    building the data model for at least one of a remote replication set, remote replication group, and remote replication pair.

9. The method of claim 1, wherein managing remote replication of storage objects for the storage array by using the storage driver comprises:
    providing a graphical user interface for a user to manage remote replication, wherein at least one element in the graphical user interface is determined by data obtained from a data model.

10. The method of claim 9, further comprising:
    receiving a request from the user, via the graphical user interface, to manage remote replication for at least one user selected device;
    verifying, using the data model, valid remote replication operations associated with the at least one user selected device; and
    presenting to the user, on a display associated with the graphical user interface, the valid remote replication operations associated with the user selected device, wherein the valid remote replication operations comprise verification of provisioning of new remote replication groups, provisioning of new remotely replicated volumes, and remote replication link management operations.

11. The method of claim 1, further comprising:
    provisioning at least one remote replication pair by:
    transmitting, to the storage driver, a request to create a source volume, a request to create a target volume, and a request to establish a link between the source volume and the target volume, wherein the request to establish the link comprises requesting remote replication mode for the link;
    in response, receiving, from the storage driver, link properties, replication mode, and replication state for the remote replication pair; and
    storing the link properties, replication mode, and replication state associated with the remote replication pair in a data model.

12. A system for use in providing remote replication management, the system comprising a processor configured to:
    provide a remote replication management framework that is device independent, comprising a development toolkit;
    detect, by a storage management system, a storage driver for a storage array, wherein the storage driver, created using the development toolkit, enables managing remote replication for the storage array, wherein the storage management system queries the storage driver to determine supported remote replication capabilities, and, wherein the storage management system requests, from the storage driver, identification of remote replication set identities associated with remote replication sets associated with the storage array; and
    manage remote replication of storage objects for the storage array by the remote replication management framework using the storage driver, wherein the storage driver includes interfaces for managing remote replication.

13. The system of claim 12, wherein the storage driver is created using a specification and the development toolkit, wherein the specification and development toolkit provides information regarding a set of interfaces required to be developed and included in the storage driver.

14. The system of claim 12, wherein the storage objects include remotely replicated volumes.

15. The system of claim 12, wherein the storage driver interacts with a remote replication management framework included in the storage management system for managing remote replication of the storage objects.

16. The system of claim 12, wherein the processor configured to detect, by a storage management system, a storage driver for a storage array is further configured to:
- query the storage driver for remote replication information; and
- build a data model for the storage array using the remote replication information.

17. The system of claim 16 wherein the processor configured to query the storage driver for remote replication information is further configured to:
- query the storage driver for at least one of storage array features or remote replication support information.

18. The system of claim 17 wherein the processor configured to query the storage driver for at least one of storage array features or remote replication support information is further configured to:
- transmit to the storage driver a request to identify at least one of remote replication sets and remote replication groups associated with the storage array, wherein the storage driver provides device specific replication features.

19. The system of claim 16 wherein the processor configured to build the data model for the storage array using the remote replication information is further configured to:
- build the data model for at least one of a remote replication set, remote replication group, and remote replication pair.

20. The system of claim 12 wherein the processor configured to manage remote replication of storage objects for the storage array by using the storage driver is further configured to:
- provide a graphical user interface for a user to manage remote replication, wherein at least one element in the graphical user interface is determined by data obtained from a data model.

* * * * *